United States Patent [19]
Puranik et al.

[11] Patent Number: 6,003,090
[45] Date of Patent: Dec. 14, 1999

[54] SYSTEM FOR DETERMINING NETWORK CONNECTION AVAILABILITY BETWEEN SOURCE AND DESTINATION DEVICES FOR SPECIFIED TIME PERIOD

[75] Inventors: Vineeta Puranik, Nashua; Utpal Datta, Bedford, both of N.H.; Rachael Barlow, Groton, Mass.

[73] Assignee: Cabletron Systems, Inc., Rochester, N.H.

[21] Appl. No.: 08/842,049

[22] Filed: Apr. 23, 1997

[51] Int. Cl.⁶ .............................. H04M 7/06; H04Q 11/04
[52] U.S. Cl. .......................... 709/235; 709/224; 709/225; 709/238; 370/232; 370/229; 370/236
[58] Field of Search ..................... 370/236, 232, 370/229; 701/118, 117; 395/200.54, 200.56; 379/133; 364/488; 709/235, 224, 225, 238

[56] References Cited

U.S. PATENT DOCUMENTS

| | | | |
|---|---|---|---|
| 4,873,517 | 10/1989 | Baratz et al. | 370/236 |
| 4,931,941 | 6/1990 | Krishnan | 701/118 |
| 4,979,118 | 12/1990 | Kheradpir | 701/117 |
| 5,581,610 | 12/1996 | Hooshiari | 379/133 |
| 5,598,532 | 1/1997 | Liron | 364/488 |
| 5,644,717 | 7/1997 | Clark | 395/200.54 |
| 5,727,157 | 3/1998 | Orr | 709/224 |
| 5,790,431 | 8/1998 | Ahrens et al. | 395/200.56 |

OTHER PUBLICATIONS

Ronald O. Brown, "Network Reliability and Availability: Tricky Calculations Mean Managers Frequently Do Not Get What They Need", *Manager's Notebook*, part 1, pp. 1–5 and part 2, pp. 1–5, Dec. 27, 1995.

*Primary Examiner*—Krisna Lim
*Attorney, Agent, or Firm*—Wolf, Greenfield & Sacks, P.C.

[57] ABSTRACT

Availability of a computer network is determined by analyzing specific pairs of source/destination devices in the network and alternative paths between them. The topology of the network is analyzed so as to determine all paths between the devices and the availability of devices on each path is determined. If any one alternative path is available, this is included in the determination of network availability. Further, a relative weight may be assigned to various devices/paths on the network depending on usage or other parameters. The availability information is then presented in the format of a report card where specific source/destination pairs and the paths therebetween are chosen as indicia of the network's availability.

19 Claims, 10 Drawing Sheets

| Sub-Section | Source-Destination Pair | Network Availability | Rating | Link To More Details |
|---|---|---|---|---|
| Nashua Router —802 | | | 808 | |
| 804 — Workstation1-NashuaRouter | | 98% 806 | Excellent | ⇨ 822 |
| 810 — Workstation2-NashuaRouter | | 91% 812 | Good 814 | ⇨ 824 |
| 816 — | Average | 94.5% 818 | Good 820 | |
| Rochester Router | | | | |
| | Workstation1-RochesterRouter | 97% | Excellent | ⇨ |
| | Workstation2-RochesterRouter | 93% | Good | ⇨ |
| | Average | 95% | Excellent | |
| Merrimac Router | | | | |
| | Workstation1-Merrimack-Router | 94% | Good | ⇨ |
| | Average | 94% | Good | |
| Abbott | | | | |
| | User1-Abbott | 75% | Poor | ⇨ |
| | User2-Abbott | 79% | Poor | ⇨ |
| | Average | 77% | Poor | |
| Shadowfax | | | | |
| | User1-Shadowfax | 98% | Excellent | ⇨ |
| | User2-Shadowfax | 92% | Good | ⇨ |
| | Average | 95% | Excellent | |

SYSTEM FOR DETERMINING NETWORK CONNECTION AVAILABILITY BETWEEN SOURCE AND DESTINATION DEVICES FOR SPECIFIED TIME PERIOD

BACKGROUND OF THE INVENTION

1. Field of the Invention

The present invention is directed to the management of computer networks, and more specifically to a method and system for determining availability of devices and paths within a computer network in order to determine and report on availability of the network.

2. Description of Related Art

Businesses and academic organizations throughout the world are now highly dependent on the operation of their computer networks and they make large investments of time and money in setting up and maintaining the same. MIS directors and system administrators work with and need to know and understand the workings of these networks, and in particular, need to be able to determine network "availability," i.e., if the network has been available to its users and if the network has been running efficiently. In doing so, it must be determined what measurements can be used to establish whether the network has been available. It is also necessary to keep track of the unavailability of the network to determine how much time has been lost because employees were prevented from doing their jobs. Finally, those components which impact network availability must be identified and their problems addressed.

In the past, network availability has been defined in different ways depending upon the focus of those persons doing the measuring and recording. For example, one purpose of availability measurement is to provide an early warning of a potential disaster, in which case network availability is defined as a ratio between MTBF (Mean Time Between Failures) and total time, where the total time equals MTBF plus MTTR (Mean Time To Repair).

In a communications network, device availability may be defined as a ratio between the time the device was available and a total time under evaluation. In this case, no consideration is given to the users and/or the functions of these devices where, for example, a wide-area link between two sites is inoperative and has no effect unless the users from one site are trying to access a facility on the other site. In other words, there may be instances where a device is inoperative, but has little or no impact on network operations because it is not being used or is lightly used.

It has been suggested that the availability of devices that are connected to each other can be aggregated, i.e., the aggregate is a product of all the availabilities of all devices in a particular path. This approach, however, has two flaws when applied to historic data. Firstly, when considering a single path between two devices, the resulting calculation will provide the most pessimistic number for the availability of the path and not the actual one. Using the most pessimistic number may mislead network managers about the actual functional availability of their networks. This inaccuracy results because the method does not account for any overlapping of down times of the devices under consideration. Secondly, the proposed approach fails to address a situation where there are multiple paths between devices in the communications network.

As a result, a system and method are necessary for providing a representation of network availability that is more comprehensive and realistic than known methods and which accounts for overlap between device down times or path down times when aggregating the availabilities for a network link. Further, a system is needed which takes into account network topology and any changes thereto.

SUMMARY OF INVENTION

According to the present invention, a method and system are provided which determine network availability by taking into account the network topology and the changes thereto. The present invention provides an accurate measurement of the availability of a destination device with respect to a source device by looking at all possible paths between the two devices. This, therefore, means that if a primary path and a redundant path are available between a source device and a destination device, any failure of the primary path will not impact network availability measurement if the network remains available via the redundant path. Further, the present invention accounts for an overlap of the unavailability of individual devices in a path so that unavailability is characterized more as a function of the path as opposed to the individual unavailabilities of the devices on the path. This last aspect, therefore, provides useful information about overall network availability, rather than the availability of isolated devices.

Specific paths between devices in the network are identified and used to characterize the network's availability. This information is then presented in the form of a report card. The report card can be customized to show specific network attributes and can be automatically generated on a scheduled basis.

These and other features and benefits of the present invention will be set forth in the following detailed description and drawings which are given by way of example only and are in no way restrictive.

BRIEF DESCRIPTION OF FIGURES

FIGS. 8, 9, and 10 are sample network availability reports as generated according to the present invention.

DETAILED DESCRIPTION

In order to measure the effectiveness of a computer network, the availability of each device on the network is generally determined. In the present invention, however, network availability is defined as the availability of useful devices and accessability to useful devices from the perspective of users of these devices. A weighted measure of availability of a device is defined as a product of the device's availability and its relative importance with respect to other network devices where, for example, a more useful device, such as a router, being unavailable will have a greater impact on network operations than a relatively scarcely used workstation. Further, point-to-point availability in a network between a source device and a destination device is an aggregate of the availabilities of all of the devices present on all possible paths between the source and the destination, taking into account non-operational overlap as described hereinafter.

The present invention focuses on useful devices and defines the availability of these useful devices in terms of point-to-point availability of the useful devices and their users. This method allows network managers to concentrate on real problems, rather then working with aggregations of the up times and down times (percentages) of all of the network devices whether or not they are "useful." As a result, "more important" devices, e.g., routers or servers, can be distinguished from "less important" devices, such as a workstation. The relative importance of the devices can be defined by several pre-selected or user-defined characteristics, e.g., volume of traffic (messages) through the device, or simply by a device characteristic, such as being a router or a server. The point-to-point availability measurement allows network managers to provide a more realistic view of the effect of unavailability of certain devices, in terms of the number of "affected users" who try to access the network through the unavailable device or devices.

Figure 1:
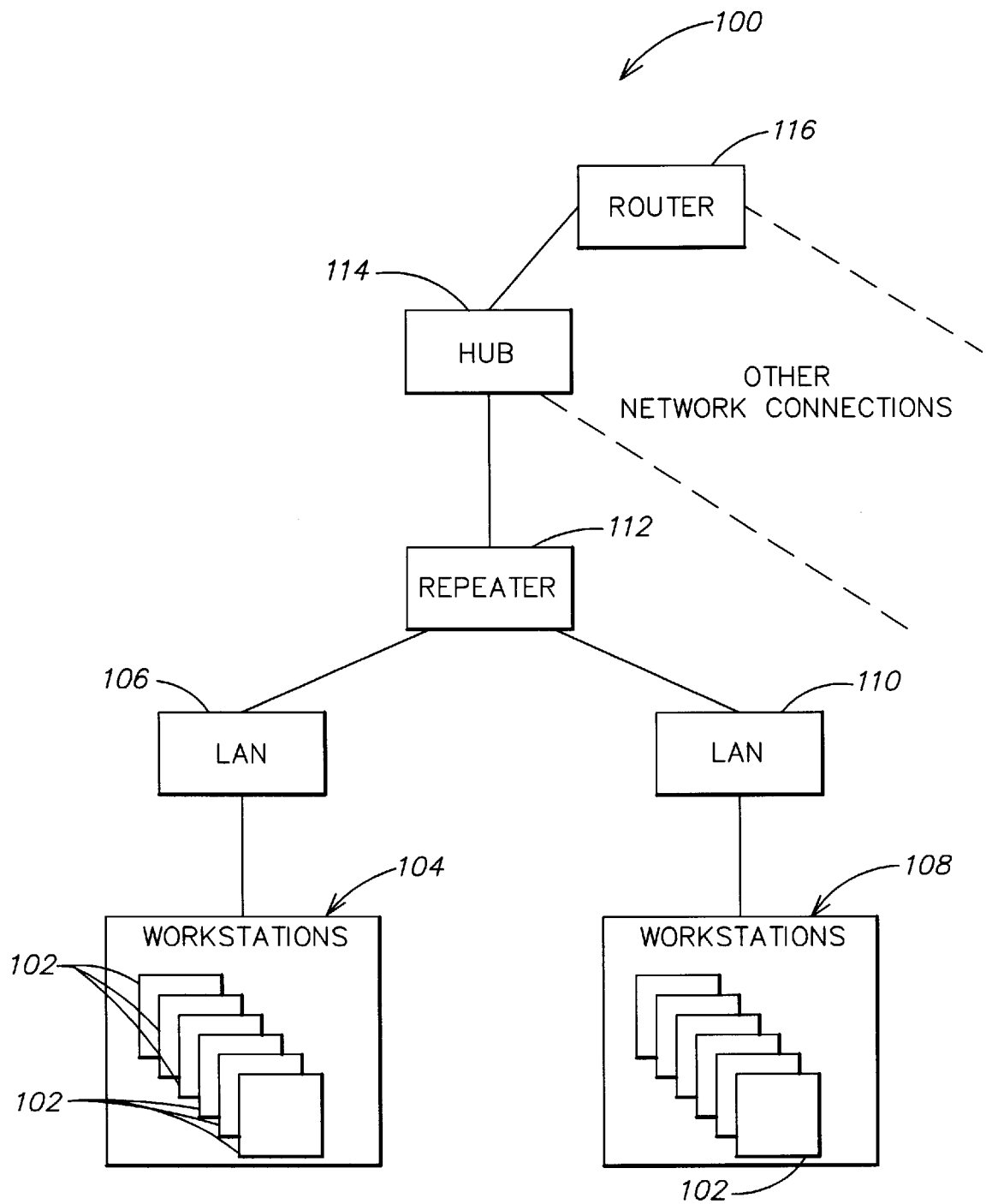
FIG. 1 is a schematic representation of a network.

As shown in FIG. 1, a network 100 may include a plurality of workstations 102 connected to one another via a local area network (LAN). Here, a first set 104 of workstations 102 are connected to a LAN 106, and a second set 108 of workstations 102 are connected to a second LAN 110. The LANs 106, 110 are each coupled to a repeater 112 which is connected to a hub 114. At what may be characterized as a highest level of the network 100, a router 116 is connected to the hub 114. As is well known, other combinations of hubs, repeaters, LANs and workstations may be connected to the router 116 and the hub 114 depending upon the size of a given network.

Many commercial network management applications are available. These include Spectrum® Network Manager, available from Cabletron Systems, Inc., Rochester, N.H., U.S.A. Operation of this network manager is described in U.S. Pat. No. 5,504,921 issued to Roger Dev et al., which is hereby incorporated by reference in its entirety.

The present invention uses the topology of the network for its determination of network availability and therefore runs in conjunction with a known tool for discovering the topology of a network. Many such tools are commercially available, such as those available from Cabletron Systems, Inc. and described in currently pending and commonly owned U.S. Pat. No. 5,727,157 issued on Mar. 10, 1999 by T. Orr et al., which is hereby incorporated by reference in its entirety.

Figure 2:
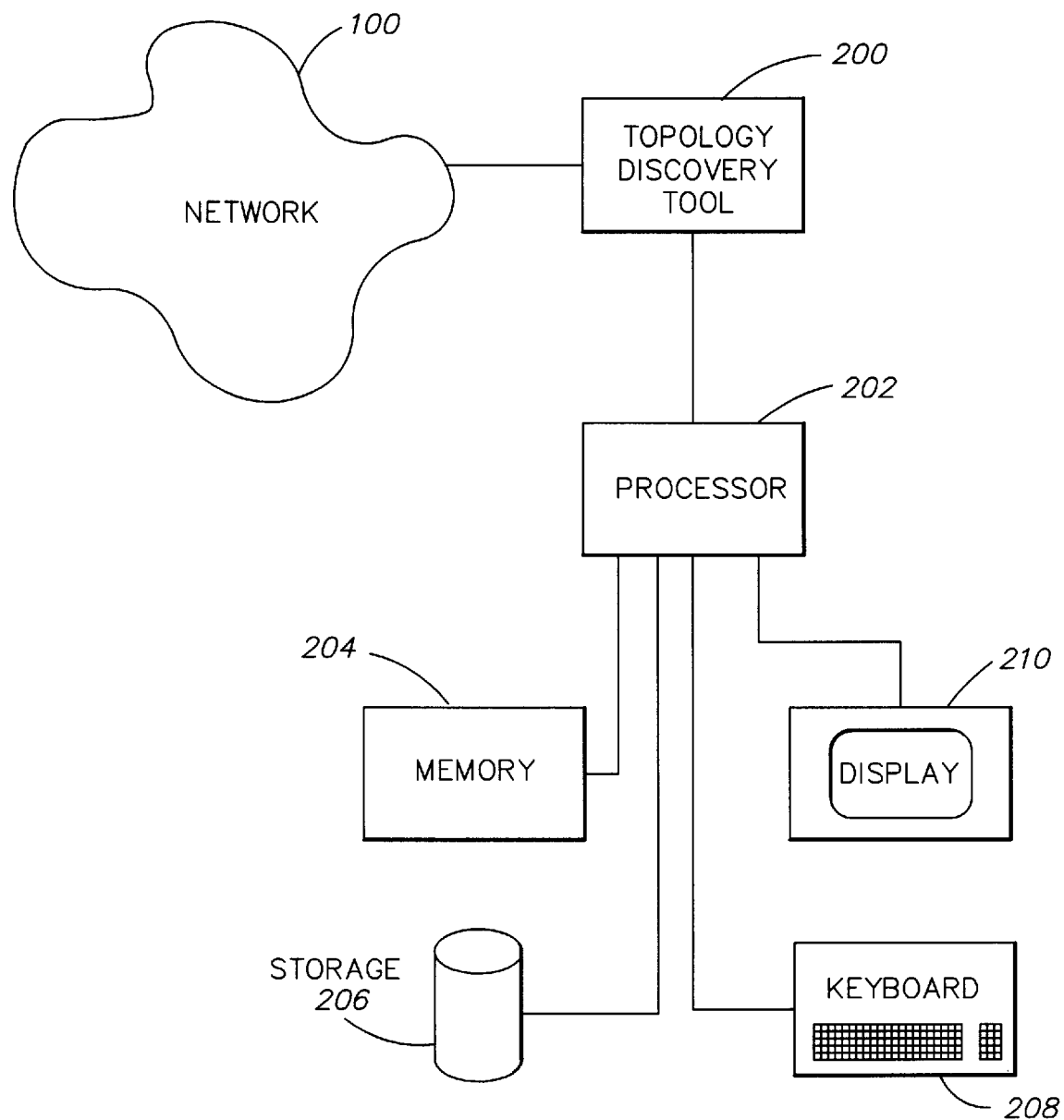
FIG. 2 is a schematic diagram of one embodiment of the present invention.

In regard to topology determination, and as shown in FIG. 2, the network 100 is coupled to a discovery tool 200 which determines the topology of the network. The determined topology is delivered to a processor 202 which is coupled to a memory 204, storage device 206, an input device (keyboard) 208 and a display device 210. The discovery tool 200 will regularly poll the network 100 and from the results of this polling determine the topology of the network at a given point in time. This information is delivered to the processor 202 which organizes the information and stores it in the storage device 206 for later use. In addition, the information may be displayed concurrently on the display 210 and an operator may gather more information by submitting appropriate commands through the keyboard 208. The processor 202 can run on various hardware platforms including, but not limited to: a SunSparc 5, 10 or 20 processor running the SunOS or Solaris operating system; and an Intel x86 (or i960) processor running Windows 3.1, Windows '95, or Windows NT (or an embedded operating system in the case of the i960).

A user may wish to determine the historical availability of a network, between a source and a destination, over a previous time period. As an example, reference is made to FIG. 3, which shows a representation of all paths between a source (S) device 300 and a destination (D) device 302. As can be seen, there are two possible paths between the source 300 and the destination 302. One path includes device (A) 304 and device (B) 306, while a second path includes device (A) 304 and device (C) 308. The first path may be referred to as S-A-B-D, and the second path as S-A-C-D.

Figure 3:
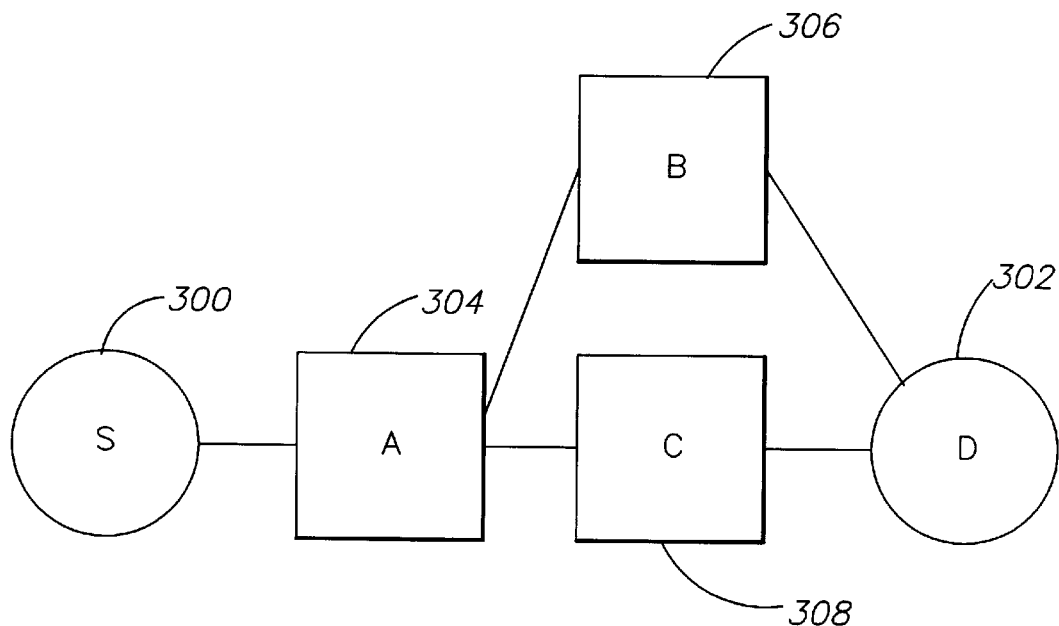
FIG. 3 is a schematic representation of a topology of a path in a network.

The point-to-point or link availability determines the historic link availability between the source 300 and the destination 302. As can be seen in the example of FIG. 3, multiple paths are available. The connection between the source 300 and the destination 302 is, therefore, considered available when any one of the possible paths is available at any moment in time during the time period of interest. According to the present invention, a determination of any overlap of unavailability between the devices and the paths is made. An advantage of the present invention is that the availability of the network is measured from the point of view of the user. Specifically, the source and destination devices are included in the calculation since these are devices which, from the perspective of a user, effect the network's availability. In other words, if a user attempts to access the network and his workstation is not functioning, then as far as that particular user is concerned the network is unavailable. The present invention polls the status of all devices, including the end stations, e.g., a user workstation, to determine when each device is operational and non-operational. One may see, however, that if a user is in the habit of shutting off a workstation at the end of the workday that this may artificially lower a network's availability result. The present invention includes the capability to measure network availability over a specific period of time, e.g., normal workday hours, so as not to be artificially impacted by such procedures as shutting off workstations when the workday is done.

Figure 4A:
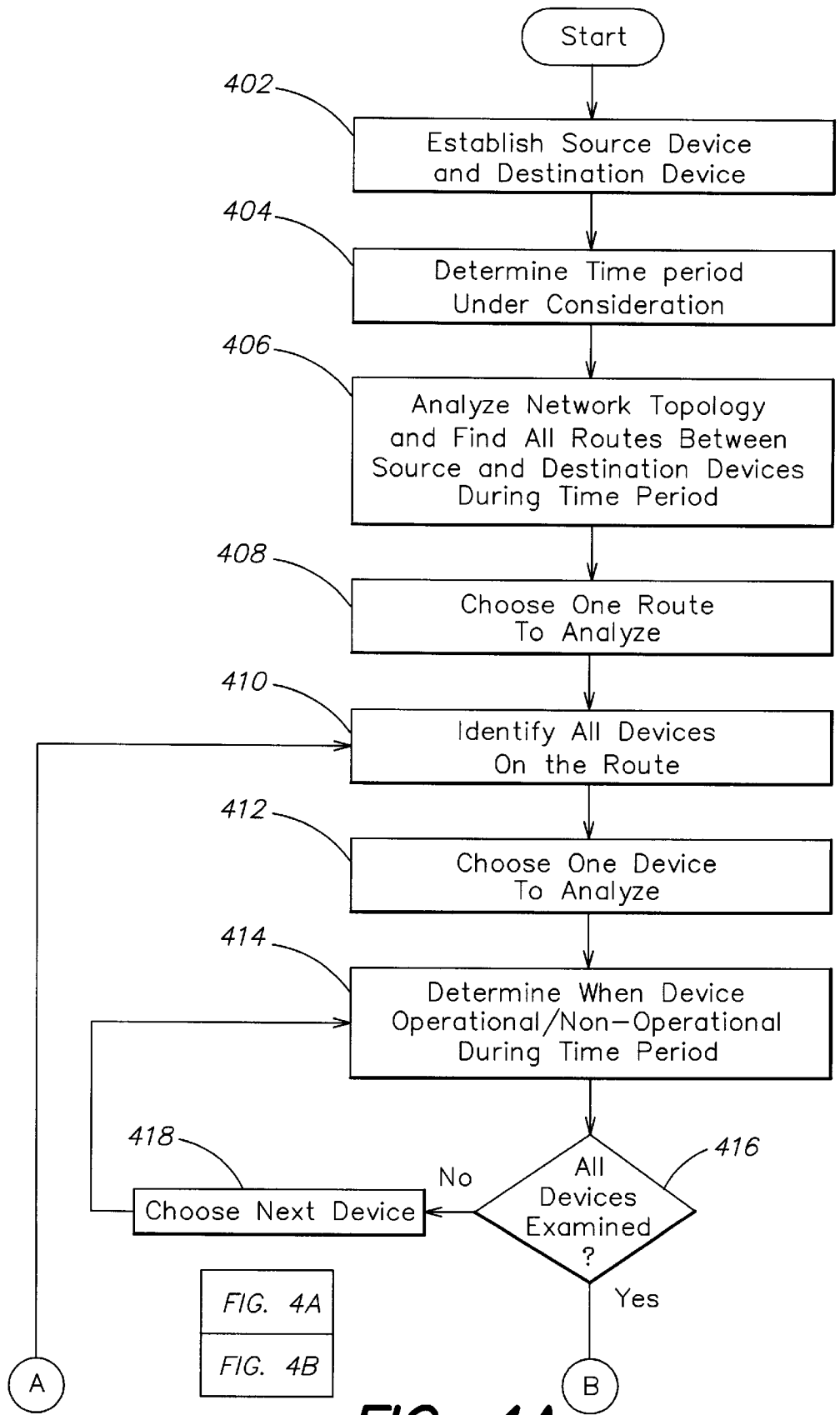
FIG. 4 is a flowchart of a first method according to a first embodiment of the present invention.
Figure 4B:
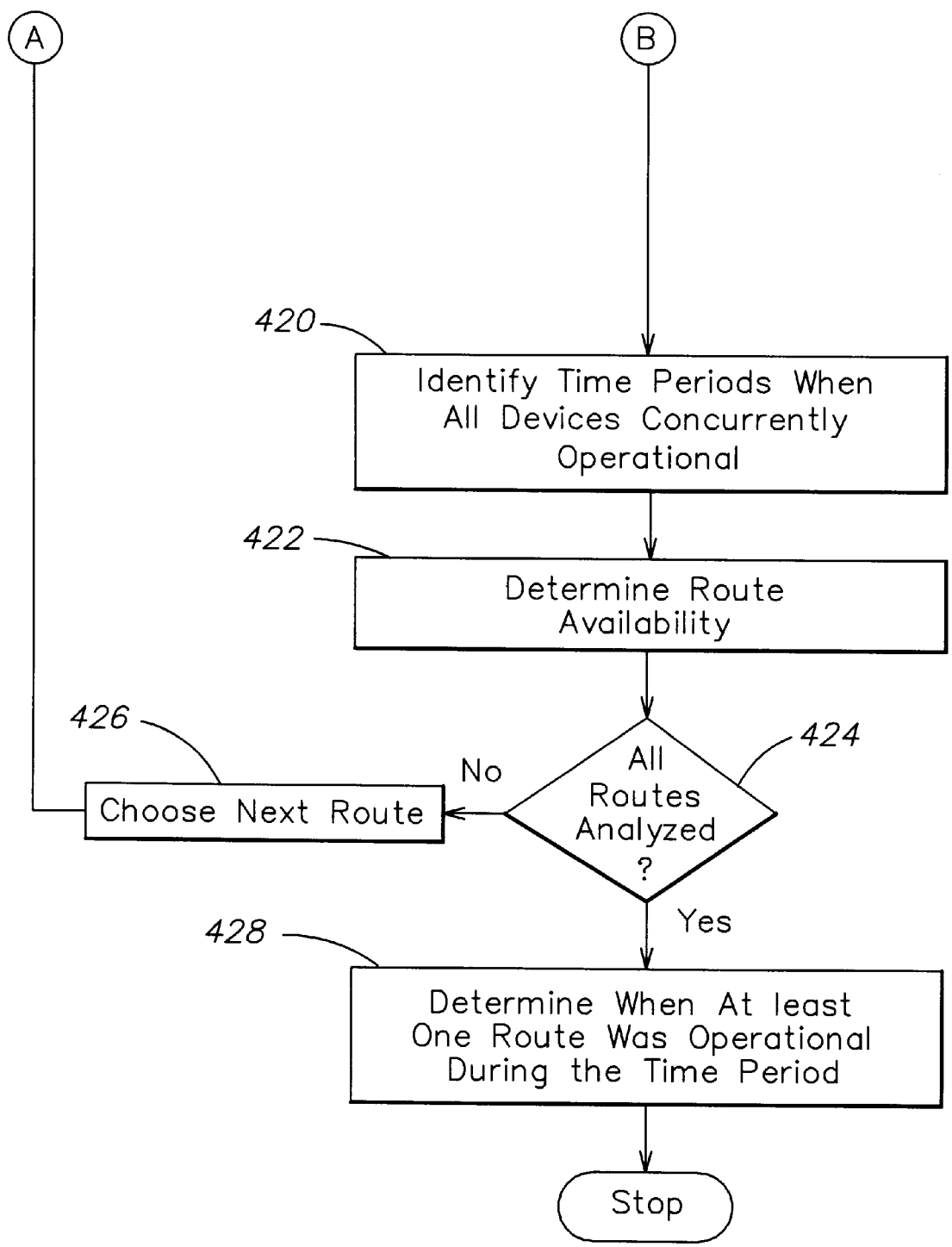

A determination of the point-to-point availability of the network, between the source 300 and the destination 302, will now be described in conjunction with the flowchart shown in FIG. 4. In step 402, the source device and destination device are established, and in step 404 the time period under consideration ("sample time period") is determined. This can be chosen by a user through the keyboard 208 or automatically scheduled, as discussed further below. The network topology is analyzed and all possible routes, and the devices thereon, between the source and destination devices which existed during the sample time period are found in step 406. As per the example of FIG. 3, these would be the paths S-A-B-D and S-A-C-D. In step 408, one route is chosen for analysis. All devices on the chosen route are then identified in step 410. Subsequently, in step 412, one device on the route is chosen for analysis. In step 414, it is determined when the chosen device was operational and non-operational during the sample time period. All devices in the route must be examined and, at step 416, if it is determined that there are remaining devices in the path to be analyzed, control passes to step 418 which chooses the next device, and then again (at step 414) the operational/non-operational condition of that next chosen device is determined.

When all devices in the chosen route have been examined, control passes to step 420 where all "operational time periods," during the sample time period, are identified as occurring when all devices in the route were concurrently operational. In step 422, the route's availability is determined as being those operational time periods. At step 424, it is determined whether or not there are remaining routes to be analyzed, and if so, control passes to step 426 which chooses a next route and then control returns to step 410. When all alternative routes and all devices on those routes have been analyzed, at step 424 control passes to step 428 where it is determined when at least one route of the available routes was operational during the sample time period (i.e., overall connection availability).

As can be seen, when there are two paths between a given source and destination and one path is unavailable, but the other path is available, the present invention will determine that a point-to point connection is still available. In other words, the operational availability of the network is better reflected by the present invention because, in reality, the source and destination are still in contact with one another and, as far as the user is concerned, the network is available. This present method, therefore, provides a more realistic representation of the operation of the network as seen by the user.

A timeline, as shown in FIGS. 5a, 5b, 5c, 5d, 5e, 5f, 5g and 5h, provides a visual representation of the determination of device availability, path availability and overall connection availability. In each of FIGS. 5a, 5b, 5c, 5d, 5e, 5f, 5g and 5h, the time period under consideration runs from time $t_0$ to time $t_{end}$. Further, the X-axis represents time while the Y-axis represents the operational or "up" condition (U) and the non-operational or "down" condition (D) of the device or path.

Figures 5A, 5B, 5C, 5D, 5E, 5F, 5G, 5H:
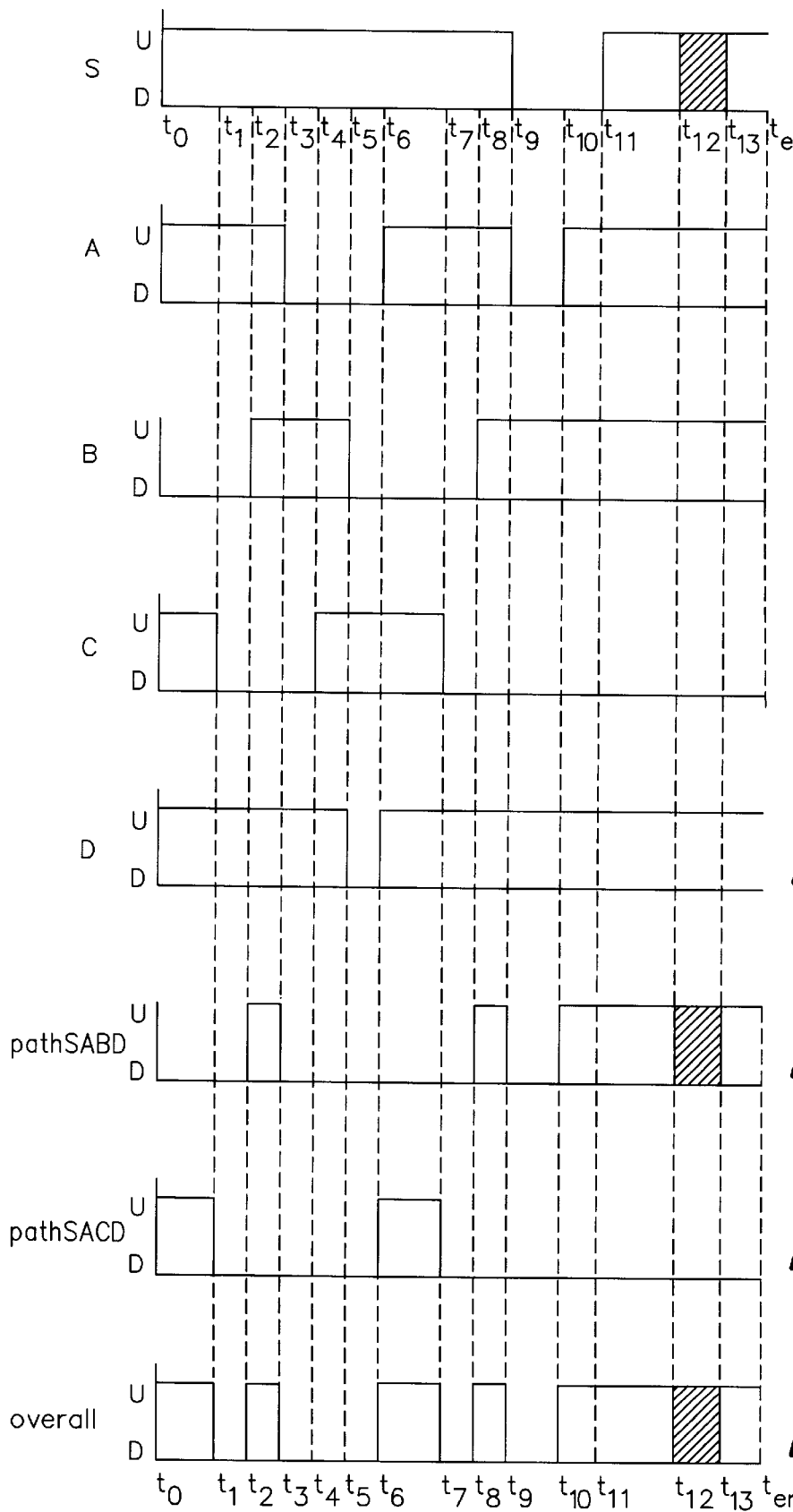
FIGS. 5a, 5b, 5c, 5d, 5e, 5f, 5g, and 5h, are timelines showing availability of devices in the topological path as found in FIG. 3.

As shown in FIG. 5a, for example, the source S 300 is up from time $t_0$ to time $t_9$, down from time $t_9$ to time $t_{11}$ and up from time $t_{11}$ to time $t_{end}$, i.e., the end of the sample time period under review.

As shown in FIG. 5b, device A 304 is up from $t_0$ to $t_3$, down from time $t_3$ to $t_6$, up from time $t_6$ to $t_9$, down from time $t_9$ to time $t_{10}$ and up from time $t_{10}$ to time $t_{end}$. FIGS. 5c, 5d and 5e represent the up/down conditions of device B 306, device C 308 and the destination device D 302, respectively, over the same sample time period.

The availability of the path S-A-B-D is shown in FIG. 5f as those time periods when device S 300, device A 304, device B 306 and device D 302 are concurrently operational. As shown, these devices are concurrently operational during the time period from time $t_2$ to time $t_3$, from time $t_8$ to time $t_9$, and from time $t_{10}$ to time $t_{end}$. Similarly, as shown in FIG. 5g, availability of path S-A-C-D is as shown. The availability of path S-A-C-D is determined as being those time periods when device A 304, device C 308 and destination D 302 are concurrently operational.

The point-to-point availability of the link between the source 300 and the destination 302 is the time when at least one of the alternative paths S-A-B-D and S-A-C-D are available. This overall availability is shown in FIG. 5h, indicating that the network was available between the source 300 and the destination 302 from time $t_0$ to time $t_1$, time $t_2$ to time $t_3$, and time $t_{10}$ to time $t_{end}$. The point-to-point network availability of the connection can then be calculated as a ratio of this overall availability (i.e., the total time the connection between the source 300 and the destination 302 was available), divided by the length of the sample time period. Accordingly, for the example shown in FIGS. 3 and 5, the ratio would be:

$$((t_1-t_0)+(t_3-t_2)+(t_7-t_6)+(t_9-t_8)+(t_{end}-t_{10}))/(t_{end}-t_0) \quad (1)$$

The resulting number would, therefore, be a measurement of the functional availability of the connection between the source 300 and the destination 302 which more closely relates to what the users at the source 300 and the destination 302 experienced. This measurement could then be used to characterize the network's overall availability.

It should be noted that there may be periods of time when the status of a particular device in a path is unknown. In other words, the monitoring system might not have been able to determine the status of the particular device. In that event, the period or periods of time during which one or more device states could not be determined would be taken out of the availability calculation. As an example, as shown in FIG. 5a, the status of the source S is unknown from time $t_{12}$ to time $t_{13}$, as represented by the cross-hatching. This would then affect the availability determination of path S-A-B-D as shown in FIG. 5f and, therefore, affect the overall availability as shown in FIG. 5h. The point-to-point network availability of the connection under these circumstances would then be:

$$((t_1-t_0)+(t_3-t_2)+(t_7-t_6)+(t_9-t_8)+(t_{12}-t_{10})+(t_{end}-t_{13}))/((t_{end}-t_0)-(t_{13}-t_{12})) \quad (3)$$

The resulting number would, therefore, now be a measurement of the functional availability between the source 300 and the destination 302 during those time periods when the up or down status of the devices could be determined. In order to characterize this ratio where the operating condition of at least one device was unknown, it would be indicated that for some period of time of the overall time period, availability could not be determined. This portion of the overall period would be equal to:

$$(t_{13}-t_{12})/(t_{end}-t_0) \quad (3)$$

As one of ordinary skill in the art can easily determine, the method of the present invention works for any number of paths between a source and destination where each path has any number of devices along it. Further, point-to-point availability can be monitored on an on-going or polled basis so that a cumulative or running measurement can be maintained. In this manner, a baseline measurement can be obtained. In addition, those time periods when the network is down for scheduled maintenance can be removed from consideration so as not to artificially lower the network availability measurement result.

In a second embodiment of the present invention, network availability is calculated using weighted measures. Each node or device in the topology is given a weighted value such that the relative importance of a node with regard to other nodes in the network can be determined. The weight can be determined using different measures, e.g., how many nodes are connected to the node under consideration, traffic at the node, or classification of the node by function or cost of using the node. Cost may be viewed as a negative weight, where use of a more expensive resource has a negative impact on network operation. These measures can therefore be any parameter that determines the importance of the node to the user. For a given section of the network, the weighted availabilities of each individual device in that given section can be aggregated.

For example, for a given device i, its relative weight ($RW_i$) is equal to the weight$_i$ assigned to the device i divided by the total of all of the weights of all of the devices in the section of the network being evaluated. This is set forth in Equation 4:

$$RelativeWeight_i = \frac{Weight_i}{\sum_{i=1}^{N} Weight_i} \quad (4)$$

N = Number of devices

The device availability ratio is equal to the amount of time the device was available divided by the length of the time period under consideration as per Equation 5:

$$Availability_i = \frac{\text{time device } i \text{ was operational}}{\text{length of time period under consideration}} \quad (5)$$

The aggregate network availability of that section is then equal to the sum as shown in Equation 6:

$$\text{Aggregate Network Availability} = \sum_{i=1}^{N} RelativeWeight_i * Availability_i \quad (6)$$

Figure 6:
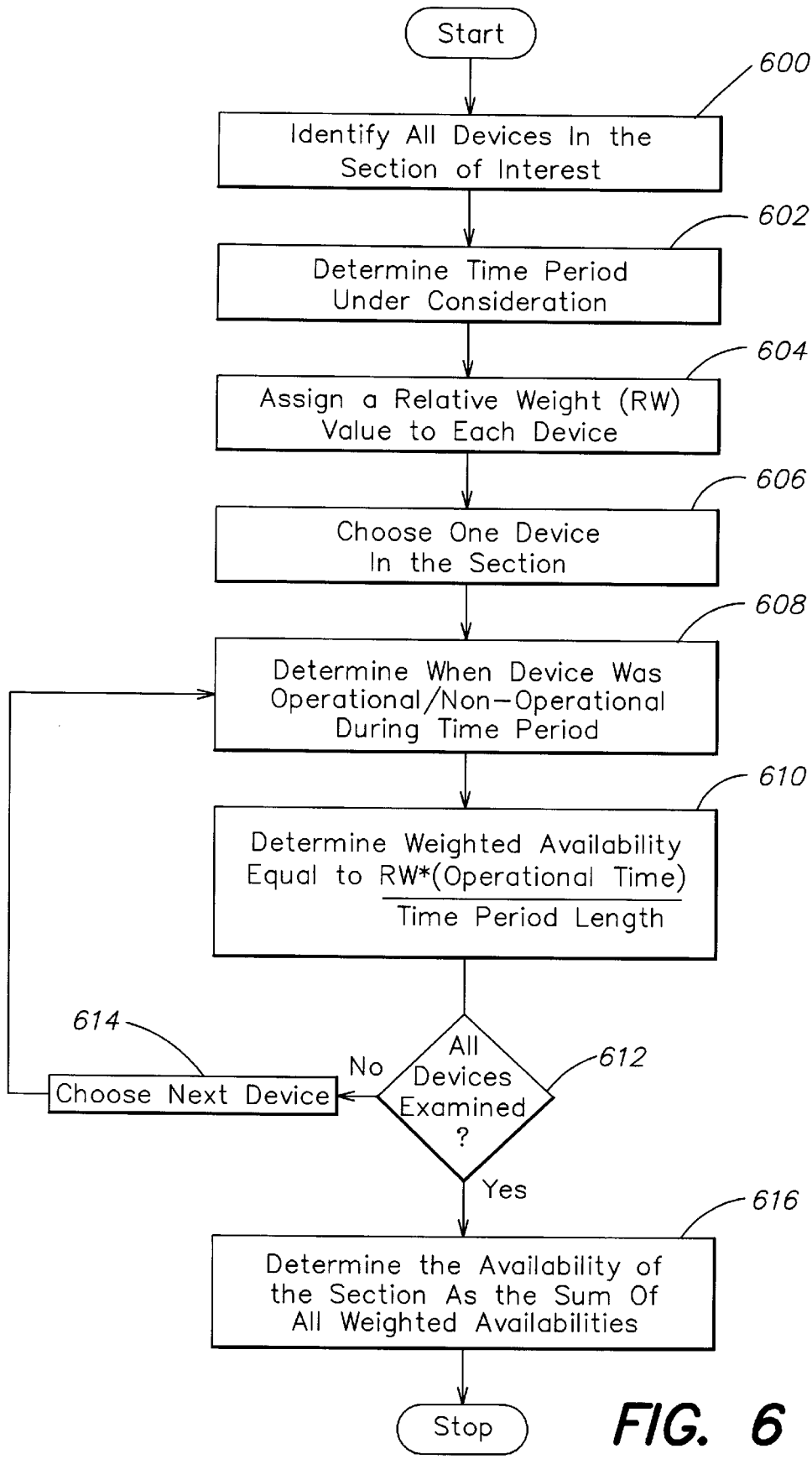
FIG. 6 is a flowchart of a second method according to a second embodiment of the present invention.

The second method embodiment is described in the flowchart of FIG. 6. At step 600, all devices in a section of interest (sample section) of the network are identified. Further, in step 602, the time period under consideration (sample time period) is determined. A relative weight (RW) is assigned to each device in step 604 (see Equation 4). In step 606, one device in the sample section is chosen and in step 608 it is determined when the chosen device was operational and non-operational during the sample time period. In step 610, the weighted availability of the device is calculated. If all devices have not been examined, as per step 612, control passes to step 614 where the next device is chosen and control then passes to step 608. When all devices have been examined as determined at step 612, the aggregate network availability of the section as the sum of all weighted availabilities is calculated in step 616 (see Equation 6).

Of course it can be seen that if the availability of a particular device cannot be determined, i.e., is unknown, those periods of time would be withdrawn from the calculation. As above, a percentage of the time period under consideration for which availability of a device or devices was unknown would be reported.

Figure 7:
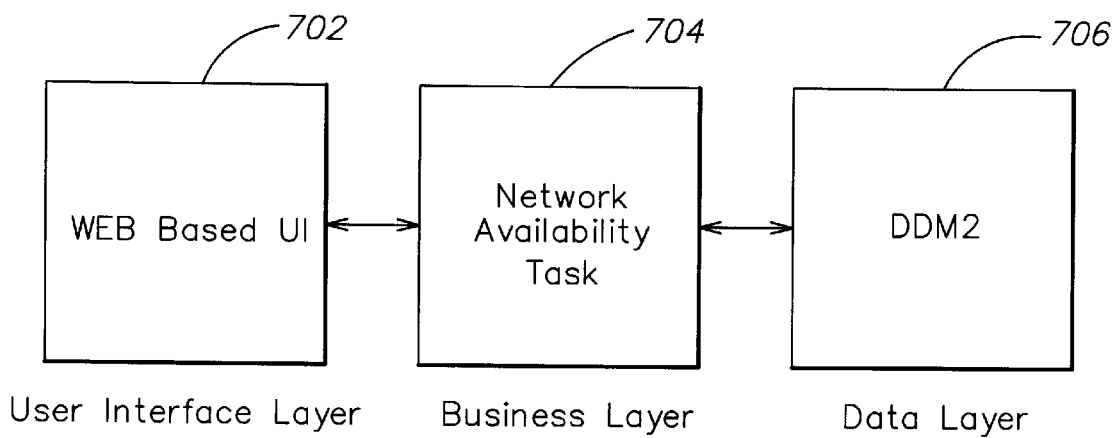
FIG. 7 is a block diagram of functional layers of a system according to the present invention.

Availability reports, generated from the data gathered from both embodiments of the present invention, would be useful to many individuals in order to assess the availability of the network. For example, as shown in FIG. 7, a network availability report system may consist of a three-layer architecture including a user interface layer 702, a network availability task or business layer 704, and a data layer 706. The data layer 706 may be implemented using Distributed Data Manager, (DDM) as available from Cabletron Systems, Inc. The user interface layer 702 can be viewed using a web browser. The data files can reside on a web server on an intranet of a facility implementing the present invention. The network availability task, in business layer 704, requests data from the data layer 706. The network availability task 704 arranges the data and generates reports to be displayed on the intranet (user interface layer 702).

By way of example, the network availability task 704 may generate three types of reports. A first type is a device availability report for devices designated by a user. A second type displays point-to-point availability between any two designated devices. A third type allows a user to determine the availability of a network in terms of availability of select paths. All types of reports may be scheduled ahead of time to run automatically or could be run by a user on demand.

The network availability task 704 may have at least two ways to obtain network topology information. First, the DDM can store the network topology and can update its topology information as a background process during off hours or at other times as directed by a user. In this manner, when a user runs a network availability report, the topology information is already in the database in a preprocessed format. The network availability task 704 will then correlate the event information with the topology information to determine the network availability.

A second option is to directly infer the topology information from what is available in a database, such as the Spectrum® Network Management System available from Cabletron Systems, Inc. A Path View application (available from Cabletron Systems, Inc.) uses this information to show a path from the source device to the destination device.

A report generated by the present invention may display the uptime and downtime for a device, selected by a user, for a given time period. The information can be displayed in a step graph format similar to that which is shown in FIGS. 5a, 5b, 5c, 5d, 5e, 5f, 5g and 5h. Further, implementing reports and analysis using SNMP protocols and taking advantage of hypertext links, HTTP, and documents in the HTML format, a user may gather and display further event information.

In addition, a report may also display historic path availability between two devices. A user may input a source and destination for a path of interest and a time period of interest, in order to generate the report. The network availability task 704 will then determine all possible paths through the network and display them.

A user can customize a report card for the network. In order to determine how a network functions during a certain time period, the user can designate key source and destination pairs as representatives for the operation of the network. The network availability task then determines the link availability for all of those pairs of devices, and creates a report card for the health of the network which can be expressed in terms of, for example, poor, good or excellent. These grades are configurable by the user where, e.g., "excellent" equals availability greater than 95%, "good" availability equals 80%–95%, and "poor" equals availability below 80%. Of course, different ranges may be chosen and these are merely set forth as examples. The report card may display availability for each pair, along with an average availability (across the pairs) and a standard deviation. Of course, one can see that such reports can be scheduled to run at predetermined times and can include other relevant data regarding network operations.

An example report card is shown in FIG. 8. As can be seen, for a particular network sub-section designated as "Nashua Router" 802, two source-destinations pairs (in column 2) have been designated to represent the availability of this sub-section. For the first source-destination pair 804, represented by Workstation1-NashuaRouter, entry 806 indicates that the network availability is 98%, resulting in a rating 808 of "excellent." The second source-destination pair 810, represented by Workstation2-NashuaRouter has a network availability 812 of 91%, and a rating 814 of "good." The average 816 of these two source-destination pairs is an average network availability 818 of 94.5%, which results in a rating 820 of "good." The report card 800 is in an HTML document, which enables a user to link to further information regarding either source-destination pair 804 and 810, by clicking on hypertext link, 822 and 824, respectively. These hypertext links provide added value in that the user is told why the link between the source and the destination was not available, and not just the fact that it was down. As above, a step-graph timeline (e.g., FIGS. 5a, 5b, 5c, 5d, 5e, 5f, 5g and 5h) can be provided to show the availability of the path, i.e., when during the sample time period the source-destination pair was available or unavailable. Any other graphic representation of the information could also be used.

With the report card 800 available in a web-browser format, a network manager need not be directly linked to the network via a network manager's console (which requires specific hardware connecting it to the network). Further, access to the report card can be granted to anyone with a web browser and, of course, access to the report card can be limited via the use of either passwords or account numbers so that potentially sensitive business information regarding the information and topology of the network can be protected. In this manner, network availability could be accessed through either the company's intranet or even the Internet with appropriate security precautions taken. Creating, maintaining and structuring a web browser to present the network availability report card is well within the capabilities of one of ordinary skill in the art.

Figure 9:
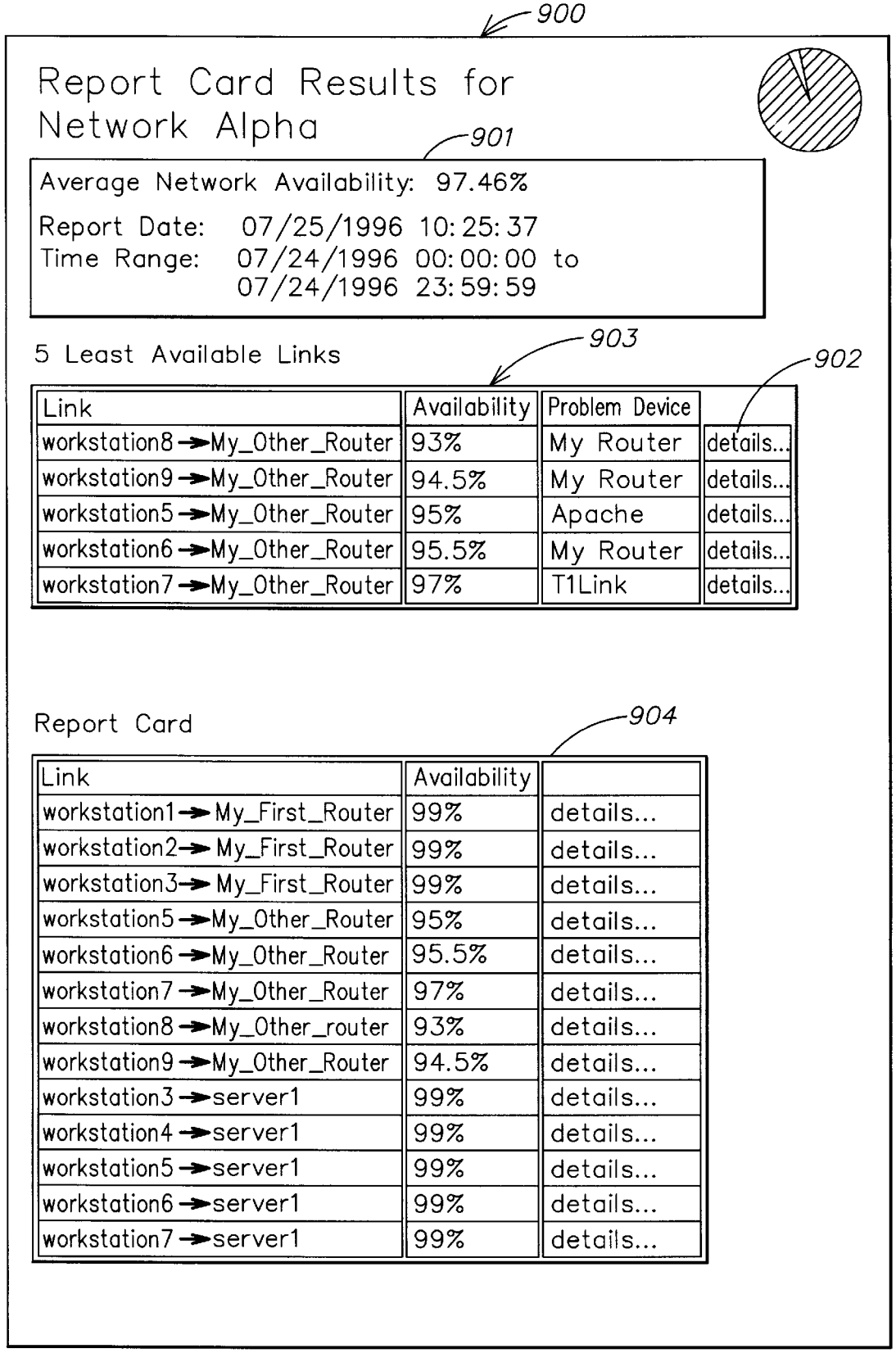

As shown in FIG. 9, a report card 900 for Network Alpha provides an average network availability calculation 901 on a particular report date for a particular time range. In addition, the five least available links 903 are displayed in ascending order. If a user desired additional information she could click on the "details" hypertext link 902 and be provided with additional information. In another section 904 of the report card, the availabilities of particular links within the network are set forth. In this example, thirteen links between different source/destination pairs are used to indicate the overall network availability. The average of these link availabilities results in the average network availability displayed at the top of the report card.

Figure 10:
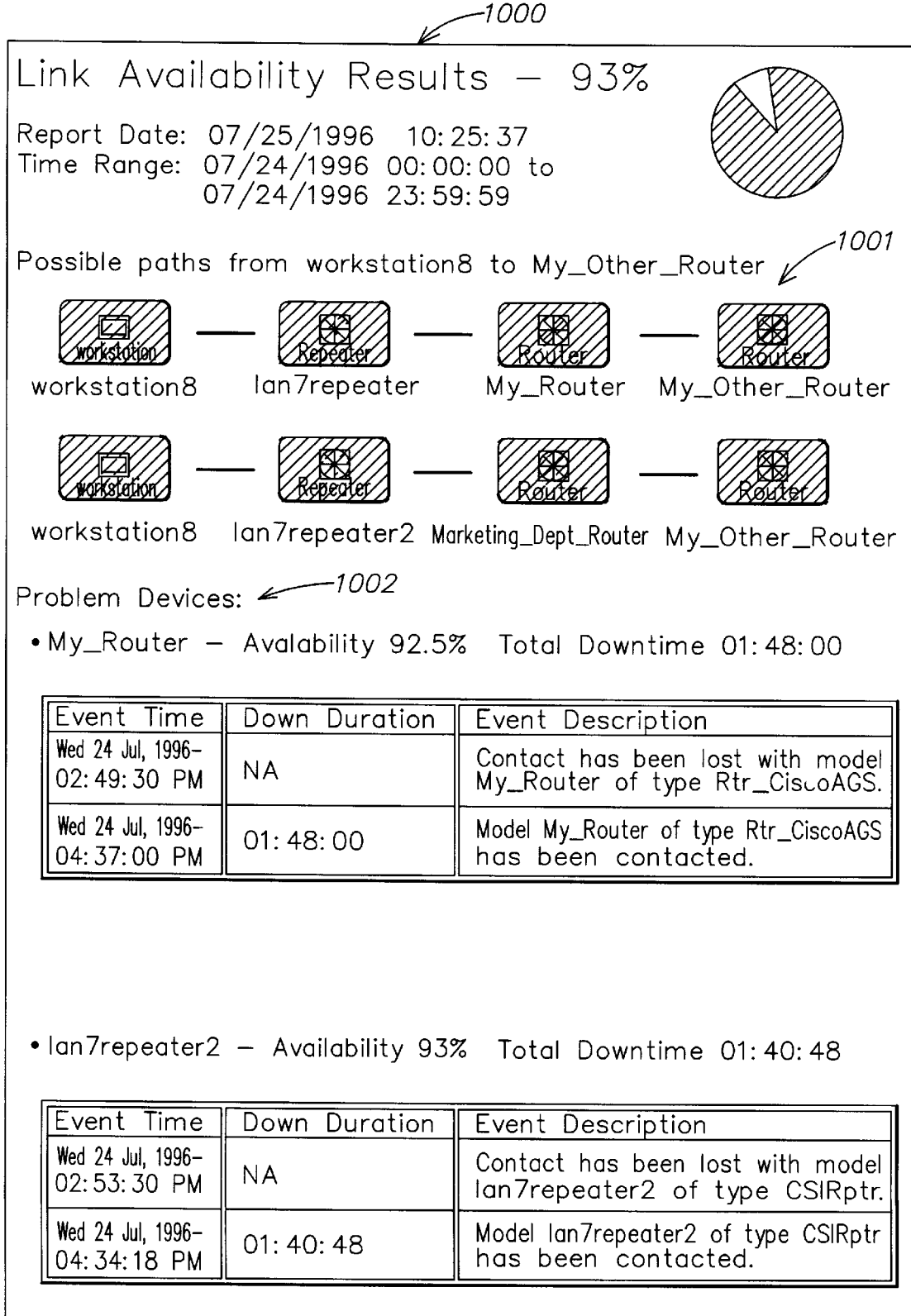

When a user chooses the details hypertext link 902, additional information 1000 can be provided (see FIG. 10). This additional information may include a graphic representation 1001 of the possible paths between, for example, workstations and My_Other_Router, as shown in FIG. 10. Those devices which have low or unacceptable availability may also be identified (Problem Devices 1002). In the example shown in FIG. 10, the devices My_Router_and land7repeater 2 are singled out for unusually low availability ratings. Events which contributed to this low availability are also presented.

The weighted measures technique, according to the second embodiment of the present invention, can be applied to a calculation of the point-to-point availability as per the first embodiment. For example, when there is a primary path and a backup path between two devices, there may be a premium (extra cost) associated with use of the backup path. Specifically, use of the backup path might induce charges which have to be paid out of an annual budget in real dollars. The impact of the use of the backup path can either be shown (to the network manager) in a report card as a cost (in dollars), or as a factor which reduces the network availability rating. Alternatively, there may be an additional rating measurement for fiscal efficiency or the like.

While an embodiment has been shown where the report is available on a private intranet or the public Internet using a browser and HTML compatible data structures it is clear that the present invention could be implemented in other ways. For example, the availability can be determined according to the present invention and presented as a report without HTML links or browsing capabilities, i.e., merely a non-interactive report. This approach is meant to be within the scope of the present invention.

Having thus described various illustrative embodiments of the present invention, various other modifications will occur to those skilled in the art that are intended to be within the scope of the present invention. Thus, this description and accompanying drawings are provided by way of example only and are not intended to be limiting.

We claim:

1. A method of determining availability, for a specified time period, of a connection within a computer network between a source device and a destination device in the computer network, the method comprising steps of:

determining all routes between the source and destination devices which existed within the computer network during the specified time period; and for each respective determined route:

determining all devices which were on the respective route during the specified time period;

for each determined device on the respective route, determining an operational time period during which the respective device was operational and a non-operational time period during which the respective device was not operational during the specified time period;

determining the respective route to have been operational during any period of time when all devices on the respective route were concurrently operational; and determining the availability of the connection as a function of all time periods when at least one route between the source and destination devices was operational during the specified time period.

2. The method as recited in claim 1, including:

determining when no route between the source and destination devices was operational during the specified time period.

3. The method as recited in claim 1, wherein for each respective determined route the method includes:

adding together all periods of operational time during which at least one route between the source and destination devices was operational during the specified time period to determine a cumulative available time duration; and determining a ratio of the determined cumulative available time duration to a duration of the specified time period.

4. The method as recited in claim 1, including displaying the determined availability of the connection.

5. A method of determining availability, for a specified time period, of a connection within a computer network between a first device and a second device in the computer network, the method comprising steps of:

(a) determining all routes between the first device and the second device that existed during the specified time period;

(b) determining all time periods when each respective route was operational during the specified time period; and (c) determining the availability of the connection in the computer network between the first and second devices for the specified time period as a function of all determined time periods when at least one determined route was operational.

6. The method as recited in claim 5, wherein step (b) includes:

(b1) determining each device on the respective route; and (b2) determining an operational time period during which a respective determined device on the respective route was operational and a non-operational time period during which the respective determined device was not operational during the specified time period.

7. The method as recited in claim 6, wherein step (b1) includes defining the first device and the second device as devices on the respective routes.

8. The method as recited in claim 6, wherein step (b) further includes:

determining the respective route to be operational during any time period within the specified time period during which all determined devices in the respective route were concurrently operational.

9. The method as recited in claim 8, wherein step (c) includes:

determining the availability of the connection to be a ratio of a total time during which at least one route was operational during the specified time period to a duration of the specified time period.

10. The method as recited in claim 9, wherein step (c) further comprises:

adjusting the ratio to exclude those time periods during which the operability of at least one device was unknown.

11. A method for determining availability, over a specified time period, of a predetermined section of a computer network, the predetermined section including a plurality of devices in the computer network, the method comprising steps of:

(a) determining a relative weight value for each device of the plurality of devices;

(b) for each device of the plurality of devices, determining an amount of operational time the respective device was operational during the specified time period;

(c) for each device of the plurality of devices, determining a weighted availability value equal to the respective relative weight value multiplied by the respective operational time and divided by the specified time period; and (d) determining the availability of the predetermined section of the computer network to be a sum of the determined weighted availability values of the plurality of devices in the predetermined section of the computer network.

12. The method as recited in claim 11, wherein step (a) comprises steps of:

(a1) assigning an absolute weight value to each device of the plurality of devices; and (a2) determining the relative weight value for a respective device to be equal to the absolute weight value of the device divided by a sum of the absolute weight values of the plurality of devices.

13. The method as recited in claim 12, wherein step (a1) comprises steps of:

measuring a number of messages which passed through the respective device during the specified time period; and determining the absolute weight value as a function of the number of messages which passed through the respective device during the specified time period.

14. The method as recited in claim 12, wherein step (a1) comprises steps of:

measuring a cost per unit time of operating a respective device during the specified time period; and determining the absolute weight value as a function of the cost per unit time of operating the device during the specified time period.

15. The method as recited in claim 14, wherein step (a1) further comprises steps of:

measuring an amount of time the respective device was utilized during the specified time period; and determining the absolute weight value as a function of the amount of time the respective device was utilized during the specified time period.

16. The method as recited in claim 12, wherein step (a1) comprises steps of:

measuring a number of other devices to which a respective device was connected during the specified time period; and determining the absolute weight value as a function of the number of other devices to which the respective device was connected during the specified time period.

17. An apparatus to determine availability, for a specified time period, of a connection within a computer network between a first device and a second device, the apparatus comprising:

a discovery tool coupled to the computer network to discover a topology of the computer network; and a processor coupled to the discovery tool to receive the discovered topology of the computer network and to determine all routes between the first and second devices in the computer network and to determine all time periods during which each route was operational during the specified time period;

wherein the processor determines the availability of the connection as a function of all determined time periods during which at least one route of all determined routes was operational during the specified time period.

18. The apparatus as recited in claim 17, further comprising:

means for displaying the determined availability of the connection.

19. The apparatus as recited in claim 17, further comprising:

means for identifying all routes in the network between the first device and the second device;

means for identifying all devices on each identified route; and means for determining an operational time period during which a respective identified device on each identified route was operational.

* * * * *